United States Patent
Kaechele

[11] Patent Number: 5,997,016
[45] Date of Patent: Dec. 7, 1999

[54] TOY VEHICLE

[76] Inventor: Annette Kaechele, P.O. Box 135, Elberta, Ala. 36530

[21] Appl. No.: 08/908,200

[22] Filed: Aug. 7, 1997

[51] Int. Cl.[6] ........................................................ B62M 1/00
[52] U.S. Cl. .............. 280/87.021; 280/828; 280/87.051; 446/470
[58] Field of Search ............................ 280/87.021, 87.05, 280/87.051, 827, 828; 446/470, 471

[56] References Cited

U.S. PATENT DOCUMENTS

| | | | |
|---|---|---|---|
| 1,420,597 | 6/1922 | Williams | 280/828 |
| 1,640,357 | 8/1927 | Howe | 280/828 |
| 1,775,483 | 4/1930 | Lundahl | 446/470 |
| 1,890,658 | 12/1932 | Swartz . | |
| 2,775,462 | 12/1956 | Biasell | 280/827 |
| 2,998,979 | 9/1961 | Sandell | 280/87.05 |
| 3,791,662 | 2/1974 | Glass et al. | 280/1.1 |
| 3,949,999 | 4/1976 | Breslow | 280/1.11 |
| 4,052,082 | 10/1977 | Jones et al. | 280/87.021 |
| 4,120,118 | 10/1978 | Mathews et al. | 446/470 |
| 4,424,978 | 1/1984 | Kassai | 280/1.13 |
| 4,513,981 | 4/1985 | DeGraaff et al. | 280/828 |
| 5,106,150 | 4/1992 | Litwicki | 296/216 |
| 5,360,222 | 11/1994 | Bro et al. | 280/87.021 |
| 5,409,263 | 4/1995 | Klatwitter | 280/827 |

FOREIGN PATENT DOCUMENTS

| | | | |
|---|---|---|---|
| 197901 | 1/1979 | United Kingdom | 280/828 |

*Primary Examiner*—J. J. Swann
*Assistant Examiner*—James S. McClellan
*Attorney, Agent, or Firm*—Joseph N. Breaux

[57] ABSTRACT

A toy vehicle which allows a child to ride thereon, the vehicle having a seat for the child and an opening in the floor of the vehicle forward of the seat to allow the child to extend his feet therethrough to contact the ground and thereby propel the vehicle, the vehicle having a sliding floor panel which can alternately be positioned to cover or to expose the floor opening, the vehicle also having a set of operable parts which simulate automotive parts, including the engine, spark plugs, air filter, coolant cap and oil dipstick, on which maintenance can be performed by a vehicle owner.

14 Claims, 3 Drawing Sheets

TOY VEHICLE

TECHNICAL FIELD

The present invention relates to riding toys and more particularly to riding toys which are designed to promote exercise and education as well as to amuse and entertain small children by providing a toy vehicle which a child can ride and propel by the action of his or her feet and which has parts which simulate the operation of actual automobile parts in order to teach the child basic elements of the operation and maintenance of automobiles.

BACKGROUND OF THE INVENTION

Numerous examples of toy vehicles, such as automobiles, trucks, ambulances, racing cars and the like can be found in the art. The primary purpose of these toys is to provide means for children to entertain themselves. Some of these toy vehicles are designed to be ridden by the children. They can be propelled by pushing the toy or by pushing pedals which in turn drive the toy. These toys which a child pushes by placing his or her feet on the ground while sitting on the toy and pushing with his or her legs can be dangerous because other children may push the toy while the rider's feet are on the ground, causing the rider's feet to be caught under the toy and injured.

These riding toys do not have any means to prevent children from being injured in this manner. The invention addresses this danger by providing a movable floor panel which provides a surface on which a child can rest his or her feet while riding the toy and being pushed by someone else, yet slides out of the way to allow the child to push the toy with his or her own legs and feet.

Toy vehicles generally are not designed to serve an educational purpose, even though there is an increasing focus on this function. For example, some dolls are designed to teach infants how to dress themselves and some electronic toys are designed to teach children to associate animals with the sounds they make or to learn addition or spelling. Toy vehicles found in the prior art, however, are only intended to amuse children, and not to teach them.

Although toy vehicles exercise children's imaginations and sometimes their bodies, they do not attempt to teach children in the same sense as "educational" toys. The invention fills this gap by introducing operational elements of vehicles, such as the engine, spark plugs, air filter, coolant cap and oil dipstick, and by providing toy tools with which children can pretend to work on these parts of the toy vehicle. The invention thereby teaches children some of the basic elements of vehicle maintenance and gives them some familiarity with vehicle operation which allows them to grow into responsible vehicle owners and drivers as adults.

SUMMARY OF THE INVENTION

It is thus an object of the invention to provide a toy vehicle on which children can ride and exercise their bodies.

It is a further object of the invention to provide a toy vehicle that has an opening in its floor through which a child can extend his or her legs and feet to the ground and thereby push the toy vehicle, the toy vehicle also having a panel which can be positioned either to expose the opening and allow the child to push the toy, or to cover the opening so that the child's feet can not be caught between the toy vehicle and the ground when the toy vehicle is pushed by external means.

It is a still further object of the invention to provide a toy vehicle that is educational.

It is a still further object of the invention to provide a toy vehicle that has parts for simulating vehicle maintenance, including the engine, spark plugs, air filter, coolant cap and oil dipstick.

It is a still further object of the invention to provide a toy vehicle that has operable doors, hood and tailgate.

Accordingly, a toy vehicle is provided. The toy vehicle has a seat on which a child can ride and an opening in the floor of the vehicle forward of the seat to allow the child to extend his feet to the ground and thereby propel the vehicle. The toy vehicle also has a sliding floor panel which can alternately be positioned to cover or to expose the floor opening, the vehicle also having a set of operable parts which simulate automotive parts, including the engine, spark plugs, air filter, coolant cap and oil dipstick, on which maintenance can be performed by a vehicle owner.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
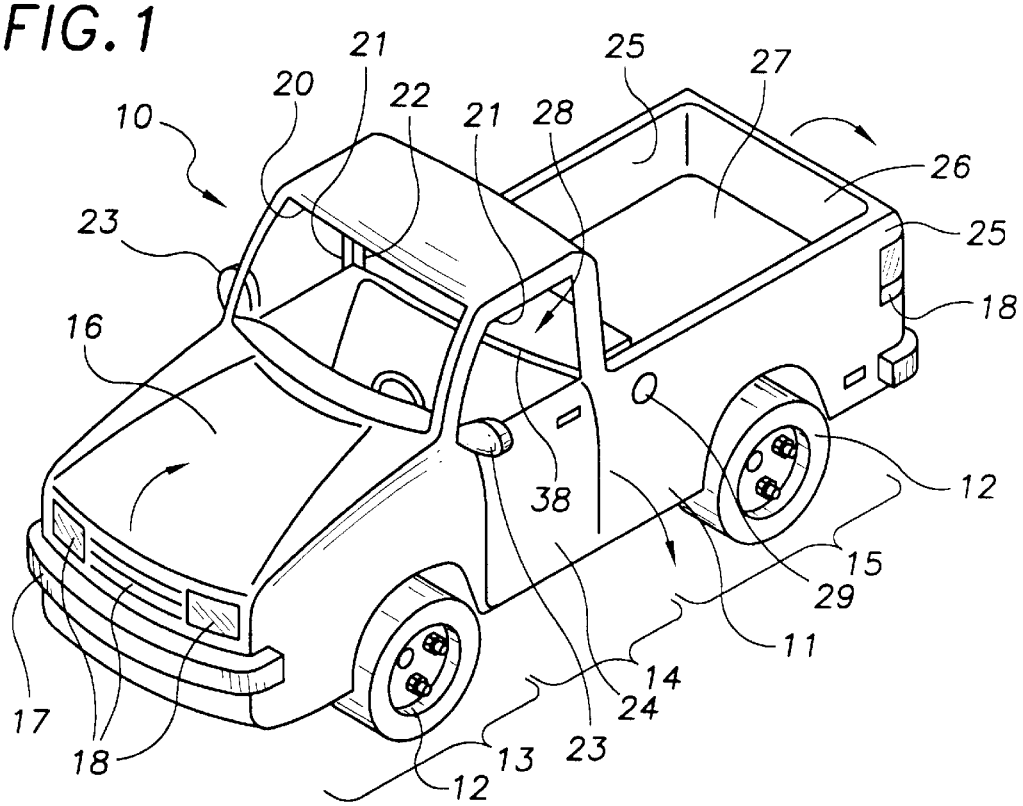
FIG. 1 is a perspective view of the preferred embodiment of the invention.

Referring to FIG. 1, the preferred embodiment of the invention, generally designated by the numeral 10, is shown. The invention has a body 11 and four wheels 12. Body 11 can be subdivided into front portion 13, cab portion 14 and rear portion 15.

Front portion 13 has a hood 16, a front bumper 17 and decals 18 which resemble a grill and headlights. Hood 16 is hinged so that it can be opened to expose engine compartment 19. Cab portion 14 has a windshield opening 20, two side window openings 21, a rear window opening 22, simulated rear view mirrors 23 and door 24. Rear portion 15 has two sidewalls 25 and a tailgate 26 which form bed 27, tool box 28 within the bed and gas cap 29.

Figure 2:
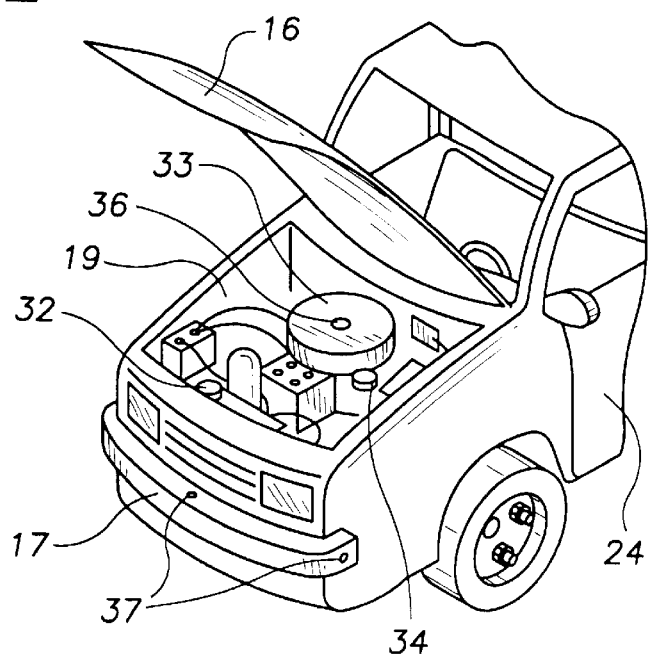
FIG. 2 is a perspective view of the front portion of the preferred embodiment of the invention with the hood raised to expose the engine compartment.
Figure 3:
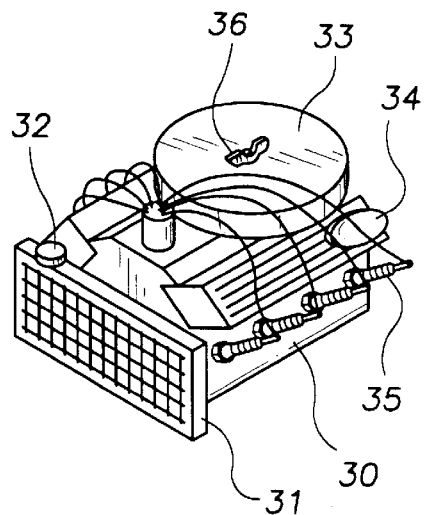
FIG. 3 is a perspective view of the engine of the preferred embodiment of the invention.

Referring to FIGS. 2 and 3, the front portion of the invention is shown with engine compartment 19 with hood 16 raised. Engine compartment 19 contains engine 30 with radiator 31 and maintenance components 32–36. Radiator 31 has an internally threaded coolant cap 32 which can be removed from and reattached to mating threads on the top of the radiator. Engine 30 has an air filter 33, oil filter 34 and spark plugs 35. Air filter 33 is attached to engine 30 by means of a threaded wing nut 36, which can be removed to allow the air filter to be removed from the engine. Oil filter 34 Is attached to engine 30 by means of threads which allow the oil filter to be alternately attached to or removed from the engine. Spark plugs 35 are also threaded so that they can be attached to the engine via mating threads. The non-threaded end of each spark plug which remains exposed when the spark plug is threaded into the engine has a string attached to it to simulate a spark plug wire. The string serves to retain the spark plug and keep it from being lost when it is unscrewed and removed from the engine. The spark plugs 35 can be removed from engine 30 by unscrewing them. FIG. 2 also shows bolts 37 in bumper 17. Bolts 37 are threaded to be attached to bumper 17 and can be removed from the bumper, but the bolts do not serve to hold the bumper on the front portion of the vehicle, so removal of the bolts does not detach any other part, such as the bumper, from the vehicle.

Figure 4:
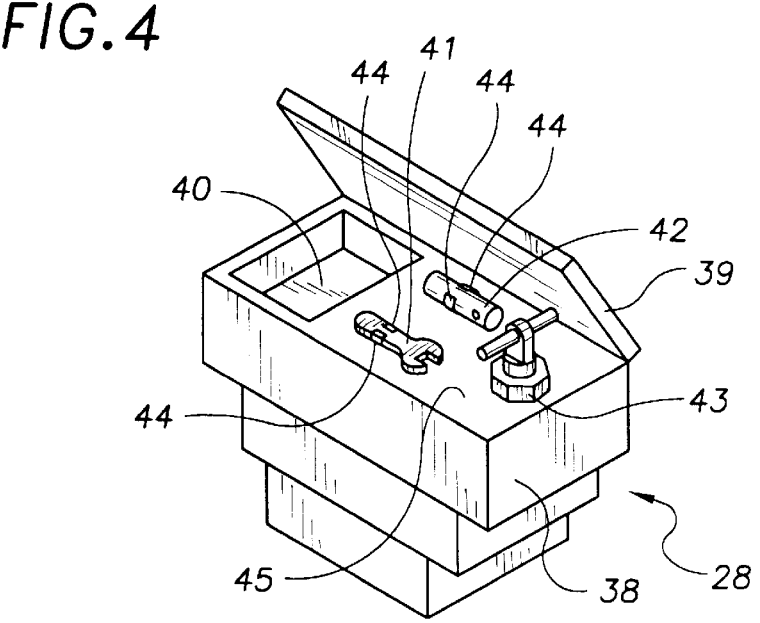
FIG. 4 is a perspective view of the tools and toolbox of the preferred embodiment of the invention.

Referring to FIG. 4, the tool box 28 of the invention is shown. Tool box 28 is attached to the vehicle within bed 27 and is not removable. Tool box 28 has a body 38 and a lid 39. Lid 39 is attached to body 38 by hinges at the side of the body nearest the cab portion 14 so that the lid can be opened and the interior of the tool box accessed. Within tool box 28 is a recessed compartment 40 and an area for storing tools (open end wrench 41, lug wrench 42 and spark plug wrench 43.)

Open end wrench 41 and lug wrench 42 are held in place by clips 44 which create a friction fit between themselves and the tools. Clips 44 are integrally molded into the surface 45 of the tool storage area. Spark plug wrench 43 fits within a recess in surface 45 and is held in place by a friction fit against the walls of the recess. Lug wrench 42 is color coded with the lug nuts 46 by manufacturing both in the same color. Spark plug wrench 43 and spark plugs 35 are color coded in the same manner. This color coding helps to teach children to associate the proper tool with the use for which it is intended.

Figure 5:
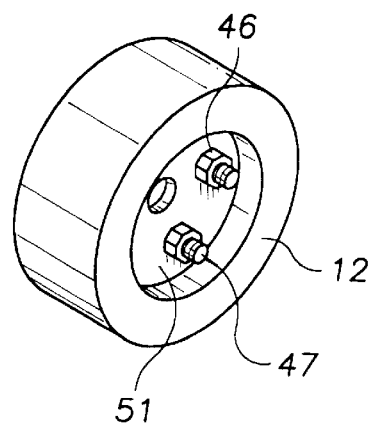
FIG. 5 is a perspective view of a wheel of the preferred embodiment of the invention.

Referring to FIG. 5, wheel 12 is shown. Wheel 12 is movably attached to body 11 so that it can freely rotate about an axis extending to the wheel on the opposite side of the vehicle. Wheel 12 cannot be removed from the vehicle. Wheel 12 does, however, have lug nuts 46 movably attached to the wheel at hub wall 51 so that a child can simulate removal of the lug nuts and wheel.

Figure 6:
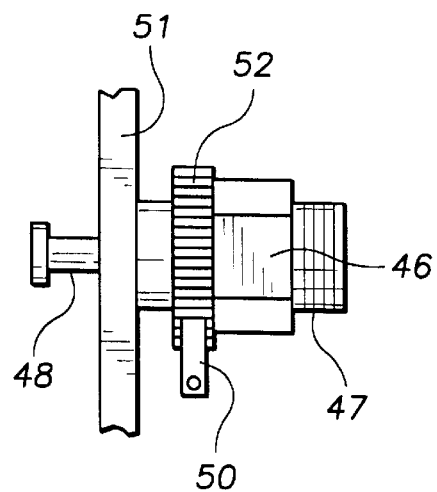
FIG. 6 is a perspective view of a lug nut of the preferred embodiment of the invention.

The detail of lug nuts 46 is shown in FIG. 6. Lug nut 46 is attached to hub wall 51 by a rivet 48 which extends through hub wall 51 and lug nut 46. Lug nut 46 then rotates about rivet 48. Simulated bolt 47 extends outward from lug nut 46, but these two parts are not threaded together, as lug nut 46 is allowed to rotate without being removed. Lug nut 46 has a ratchet surface 52 which runs around the periphery of the lug nut. Ratchet surface 52 is on the side of lug nut 46 nearest hub wall 51. Ratchet finger 50 is a flat, resilient spring which makes a clicking sound as the end of the ratchet finger springs into contact with the teeth of ratchet surface 52. Ratchet finger 50 is rigidly connected to hub wall 51 so that rotation of lug nut 46 causes the ratchet finger to generate the clicking noise.

Figure 7:
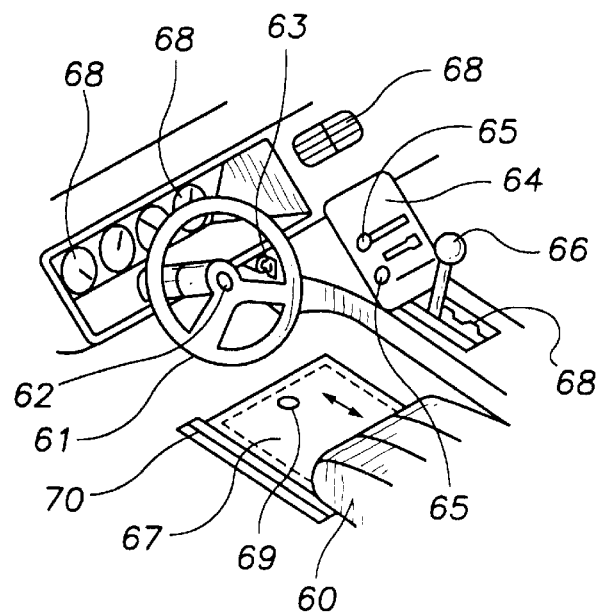
FIG. 7 is a perspective view of the interior of the cab portion of the preferred embodiment of the invention.
Figure 8:
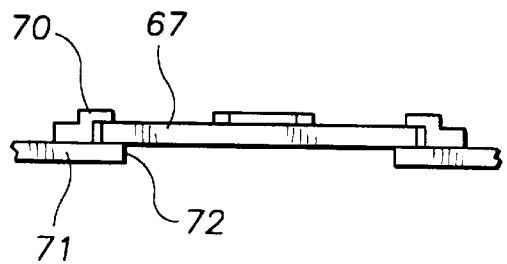
FIG. 8 is a cross section of the floor of the preferred embodiment of the invention.

Referring to FIG. 7, the interior of the cab portion 14 is shown. The cab portion has a seat 60, steering wheel 61 with a horn 62, a rotating ignition key 63, a simulated radio 64 with rotating knobs 65, a movable stick shift 66, a sliding floor panel 67 and various decals 68 to simulate other vehicle features. Steering wheel 61, ignition key 63 and knobs 65 freely rotate. Knobs 65 each have the same noisemaking mechanism as the lug nuts. Ignition key 63 is not removable, but is instead permanently, rotatably attached to the cab portion 14. Horn 62 is a squeeze-bulb type horn which is permanently attached to the center of steering wheel 61. Stick shift 66 is movable is a generally linear fashion toward and away from radio 64.

Sliding floor panel 67 is located at the bottom of cab portion 14 forward of seat 60. Panel 67 is held in position by two guides 70 which are integrally molded into floor 71 and which extend upward and over the right and left edges of panel 67. Panel 67 can be slid into a forward position (shown in FIG. 7) in which it covers opening 72, or a rearward position in which it is disposed under seat 60, exposing opening 72. Panel 67 has a hole 69 which acts as a handle for the panel. Hole 69 is sized so that several fingers can be inserted through the hole and the panel pushed forward or backward into one of its two positions.

Opening 72 is large enough to allow a child sitting on seat 60 to place his or her feet on the ground (with panel 67 in its rearward position) and push on the ground to move the vehicle. If the child sitting on seat 60 wishes for the vehicle to be pushed by someone else, panel 67 can be slid into its forward position so that the child's feet can rest on the panel. The danger of the child's feet getting caught between the ground and floor 72 and thereby injuring the child is thus avoided.

Most of the parts of the vehicle are formed through an injection molding process. A number of these parts may be formed integrally with the body 11 rather than separately. For example, radio 64 is not a separate piece, but is instead a molded surface of body 11. Other parts which are removable, such as coolant cap 32 and spark plugs 35, are manufactured as separate parts using the same injection molding process. Horn 62 is manufactured from rubber or similar resilient materials.

The preferred embodiment of the invention is a toy vehicle in the shape of a truck, but other embodiments may take the form of cars or other utility vehicles. Other embodiments may also use different combinations of operable parts with which maintenance on the vehicle can be simulated.

A child can play with the vehicle by riding on it or by using the operable parts to simulate maintaining the vehicle. If the sliding floor panel is in its rearward position, the child can ride the vehicle while pushing it himself or, if the sliding floor panel is in its forward position, he or she can ride the vehicle while someone else pushes it. While riding the vehicle, the child can play with the steering wheel, horn, ignition key, radio knobs and stick shift.

If the child does not wish to ride the vehicle, he or she can play with it by simulating maintenance on the engine, air filter, oil filter, oil dipstick, radiator, coolant cap, wheels and lug nuts. The toy tools can actually be used to turn the lug nuts and remove the spark plugs and can be used to pretend that other maintenance is being performed on the vehicle.

It can be seen from the preceding description that a toy vehicle on which children can ride that has an opening in its floor through which a child can extend his or her legs and feet to the ground and thereby push the toy vehicle, the toy vehicle also having a panel which can be positioned either to expose the opening and allow the child to push the toy, or to cover the opening so that the child's feet can not be caught between the toy vehicle and the ground when the toy vehicle is pushed by external means, that is educational, and that has parts for simulating vehicle maintenance, including engine, air filter, oil filter, oil dipstick, radiator, coolant cap, wheels, lug nuts, hood, tailgate, gas cap, door and tool box has been provided.

It is noted that the embodiment of the toy vehicle described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A toy vehicle comprising:

a body in the shape of a vehicle, said body having a cab portion with a floor surface;

a plurality of wheels rotatable attached to said body and supporting said body;

a seat attached to said body at said cab portion above and to the rear of said floor surface;

an opening extending through said floor surface, said opening being sized to accommodate a child's legs therethrough;

a floor panel movably connected to said floor surface, said floor panel being movable between a first position in which said floor panel is disposed across said opening and a second position in which said floor panel is disposed to a side of said opening, said opening being unobstructed by said floor panel in said second position;

said floor panel having two edges, each said edge being on an opposite side of said floor panel and wherein said floor panel is slidingly attached to said body by a set of guides which contact said edges and allow said edges to move slidingly along said guides.

2. The toy vehicle of claim 1, wherein said floor panel has an aperture extending therethrough, said aperture being sized to allow several fingers to fit therewithin to provide means to grasp said floor panel and move said floor panel to one of said first and second positions.

3. The toy vehicle of claim 1, further comprising one or more operable parts selected from the group consisting of: a hood hingedly connected to said body; a cab portion door hingedly connected to said body; and a tailgate hingedly connected to said body.

4. The toy vehicle of claim 1, further comprising one or more operable maintenance parts selected from the group consisting of: a lug nut rotatably connected to one of said wheels; a spark plug threadedly and removably connected to said body; a coolant cap removably connected to said body; a gas cap removably connected to said body; an oil filter removably connected to said body; an air filter removably connected to said body by means of a threaded wing nut; and a bolt threadedly and removably connected to said body.

5. The toy vehicle of claim 4, further comprising one or more tools for engaging said operable maintenance parts and wherein said body has a tool storage portion, said tool storage portion having means for retaining said tools when said tools are not in use.

6. The toy vehicle of claim 5 wherein each of said tools has a color and each of said operable maintenance parts is color coded to match said color of said tool which engages said operable maintenance part.

7. The toy vehicle of claim 4, wherein said spark plug has a lower end and an upper end, said lower end being threaded for connection to said body, said upper end having a first end of a string connected thereto, said string having a second end which is connected to said body.

8. The toy vehicle of claim 4, wherein said lug nut has an inner portion and an outer portion, said outer portion having a hexagonal peripheral surface and said inner portion having a roughly circular peripheral surface, said circular peripheral surface having a plurality of teeth, said wheel having a ratchet finger adjacent said inner portion of said lug nut, a first end of said ratchet finger being affixed to said wheel, a second end of said ratchet finger extending toward and contacting said circular peripheral surface, rotation of said lug nut causing said teeth on said circular peripheral surface to repeatedly flex said ratchet finger and release said ratchet finger, thereby causing said ratchet finger to strike adjacent teeth and make a clicking noise.

9. A toy vehicle comprising:

a body in the shape of a truck, said body having a front portion, a cab portion and a rear portion;

four wheels connected to said body, each of said wheels having an axis about which said wheel freely rotates;

a floor having an opening therethrough, said floor opening being sized to accommodate a child's legs therethrough; and a floor panel slidably connected to said floor surface by a pair of guides, said floor panel being movable between a first position in which said floor panel is disposed across said floor opening and a second position in which said floor panel is disposed under said seat, said floor opening being unobstructed by said floor panel in said second position, said floor panel having an aperture extending therethrough, said aperture being sized to allow several fingers to fit therethrough to provide means to grasp said floor panel and move said floor panel to one of said first and second positions;

said front portion having an engine compartment formed therein, said engine compartment having a hood opening at the top thereof, said engine compartment having a hood which is hingedly connected to said front portion, said hood having a first position and a second position, said hood being disposed in said hood opening and thereby enclosing said engine compartment when said hood is in said first position, said hood being rotated upward out of said hood opening and thereby exposing said engine in said engine compartment when said hood is in said second position;

said rear portion having a bed compartment therein, said bed compartment having a front wall, two side walls, a lower bed surface and a tailgate, said tailgate being hinged to rotate about a lower edge thereof;

said cab portion having a passenger compartment therein, said passenger compartment having a plurality of window openings and at least one door hingedly connected thereto, said passenger compartment having a seat disposed therein, said passenger compartment further having therein a freely rotating steering wheel, a freely rotating and a pivoting stick shift lever movably connected to said body, said steering wheel having a squeeze-bulb horn connected thereto;

said engine compartment of said body having a simulated engine therein, said engine having at least one engine maintenance component connected thereto, said engine maintenance component being movable with respect to said engine to simulate maintenance on said engine maintenance component;

each of said wheels having at least one simulated lug nut movably connected thereto, said lug nut being rotatable with respect to said wheel.

10. The toy vehicle of claim 9, wherein said engine maintenance component is selected from the group consisting of: a spark plug threadedly and removably connected to said engine; a coolant cap removably connected to said engine; an oil filter removably connected to said body; and an air filter removably connected to said engine by means of a threaded wing nut.

11. The toy vehicle of claim 10, further comprising one or more tools for engaging said engine maintenance component and simulating maintenance on said vehicle.

12. The toy vehicle of claim 11 wherein each of said tools has a color and each said engine maintenance component is color coded to match said color of said tool which engages said engine maintenance component.

13. The toy vehicle of claim 12, further comprising a toolbox which is disposed within said bed compartment and connected to said body, said toolbox having a first storage area and a second storage area, said first storage area having means for retaining said tools therein, said second storage area having a recessed compartment therein, said toolbox having a hinged lid which closes over said first and second storage areas.

14. The toy vehicle of claim 13, wherein said lug nut has an inner portion and an outer portion, said outer portion having a hexagonal peripheral surface and said inner portion having a roughly circular peripheral surface, said circular peripheral surface having a plurality of teeth, said wheel having a ratchet finger adjacent said inner portion of said lug nut, a first end of said ratchet finger being affixed to said wheel, a second end of said ratchet finger extending toward and contacting said circular peripheral surface, rotation of said lug nut causing said teeth on said circular peripheral surface to repeatedly flex said ratchet finger and release said ratchet finger, thereby causing said ratchet finger to strike adjacent teeth and make a clicking noise.

* * * * *